(12) United States Patent
Romo et al.

(10) Patent No.: US 6,895,161 B2
(45) Date of Patent: May 17, 2005

(54) VARIABLE OPTICAL ATTENUATOR

(75) Inventors: Mark George Romo, Eden Prairie, MN (US); Liang-Ju Lu, Eden Prairie, MN (US); Charles Ray Willcox, Eden Prairie, MN (US); Stanley Edward Rud, Jr., Victoria, MN (US)

(73) Assignee: Rosemount Inc., Eden Prairie, MN (US)

( * ) Notice: Subject to any disclaimer, the term of this patent is extended or adjusted under 35 U.S.C. 154(b) by 24 days.

(21) Appl. No.: 10/261,111

(22) Filed: Sep. 30, 2002

(65) Prior Publication Data

US 2004/0062510 A1 Apr. 1, 2004

(51) Int. Cl.[7] .................................................. G02B 6/00
(52) U.S. Cl. .......................................... 385/140; 385/52
(58) Field of Search .................................. 385/140, 52

(56) References Cited

U.S. PATENT DOCUMENTS

| | | |
|---|---|---|
| 4,938,552 A | 7/1990 | Jebens et al. |
| 5,080,458 A | 1/1992 | Hockaday |
| 5,214,727 A | 5/1993 | Carr et al. |
| 5,226,104 A | 7/1993 | Unterleitner et al. |
| 5,319,728 A | 6/1994 | Lu et al. |
| 5,353,363 A | 10/1994 | Keck et al. |
| 5,382,275 A | 1/1995 | Decao et al. |
| 5,404,417 A | 4/1995 | Johnson et al. |
| 5,727,099 A | 3/1998 | Harman |
| 5,745,634 A | 4/1998 | Garrett et al. |
| 5,862,003 A | 1/1999 | Saif et al. |
| 5,864,643 A * | 1/1999 | Pan .............................. 385/22 |
| 5,907,404 A | 5/1999 | Marron et al. |
| 6,085,016 A | 7/2000 | Espindola et al. |
| 6,130,984 A | 10/2000 | Shen et al. |
| 6,144,794 A | 11/2000 | Mao et al. |
| 6,163,643 A | 12/2000 | Bergmann et al. |
| 6,173,105 B1 | 1/2001 | Aksyuk et al. |
| 6,173,106 B1 | 1/2001 | DeBoynton et al. |
| 6,246,826 B1 | 6/2001 | O'Keefe et al. |
| 6,266,474 B1 | 7/2001 | Han et al. |

(Continued)

FOREIGN PATENT DOCUMENTS

| | | |
|---|---|---|
| WO | WO 02/22494 | 3/2002 |
| WO | WO 03/058286 | 7/2003 |

OTHER PUBLICATIONS

M. Hoffmann, et al., "Lensless Latching–Type Fiber Switches Using Silicon Micromachined Actuators," pp. 1–4.
P. Kopka et al., "Bistable 2×2 and Multistable 1×4 Micromechanical Fibre–optic Switches on Silicon," pp. 88–90.

(Continued)

*Primary Examiner*—Karl D. Frech
*Assistant Examiner*—Daniel A. Hess
(74) *Attorney, Agent, or Firm*—Marshall, Gerstein & Borun LLP

(57) ABSTRACT

A variable optical attenuator has a first movable waveguide support and a second waveguide support that include first and second waveguides, respectively, such that the first and second waveguides are aligned for propagating an optical energy. An electrically driven actuator positions the movable waveguide support for coupled, optical misalignment relative to the second support to achieve a desired optical attenuation value. The movable waveguide support may be in a cantilevered configuration in which a distal end extends over a surface having an electrode. In this example, applying a drive signal to the electrode deflects the movable support such that the signal coupled between the first waveguide to the second waveguide is attenuated. The drive signal may be set to achieve a desired value for an electrical parameter that varies with the position of the movable waveguide support. In some examples, the drive signal is set to achieve a desired capacitance or voltage difference between the movable waveguide support and the electrode.

45 Claims, 15 Drawing Sheets

U.S. PATENT DOCUMENTS

| | | | |
|---|---|---|---|
| 6,275,320 B1 | 8/2001 | Dhuler et al. | |
| 6,275,643 B1 | 8/2001 | Bandy et al. | |
| 6,311,010 B1 | 10/2001 | Medeiros | |
| 6,320,999 B1 | 11/2001 | Pouteau et al. | |
| 6,363,183 B1 | 3/2002 | Koh | |
| 6,363,203 B1 | 3/2002 | Dautartas | |
| 6,577,793 B2 * | 6/2003 | Vaganov | 385/52 |
| 6,625,356 B2 * | 9/2003 | Ticknor et al. | 385/39 |
| 6,628,882 B2 | 9/2003 | Vaganov et al. | |
| 2002/0031305 A1 | 3/2002 | Ticknor et al. | |

OTHER PUBLICATIONS

Eng, et al. "Voltage—Controlled Micromechanical SOI Optical Waveguides," *IEEE Tencon* (1995) pp. 195–197.

Wood, et al. "SCOFFS: A Small Cantilevered Optical Fiber Servo System," *IEEE* (1987).

M. Hoffmann, et al., "Lensless Latching–Type Fiber Switches Using Silicon Micromachined Actuators," $25^{th}$ Optical Fiber Communication Conference, OFC 1000, Baltmore, Maryland, USA, Technical Digest, Thursday, Mar. 9, 2000.

P. Kopka et al., "Bistable 2×2 and Multistable 1×4 Micromechanical Fibre–optic Switches on Silicon," $3^{rd}$ International Conference on Micro Opto Electro Mechanical Systems, MOEMS'99, Mainz, 1999, Proceedings pp. 88–91.

International Search Report from PCT/US03/26190.

Hoffmann, et al., "Optical fibre switches based on full wafer silicon micromachining," *J. Micromech. Microeng.* 9:151–155 (1999).

Watts, et al., "Electromechanical Optical Switching and Modulation in Micromachined Silicon–On–Insulator Waveguides," *IEEE* 62–63 (1991).

Wu, et al., "Deflecting–fiber type MEMS variable optical attenuator," *Proc. SPIE* 4604:61–66 (2001).

Zhang, et al., "A Vertical Electrostatic Actuator with Extended Digital Range via Tailored Topology," *Proc. SPIE* 4700:147–156 (2002).

International Preliminary Examination Report for PCT/US03/36190 mailed Aug. 9, 2004.

* cited by examiner

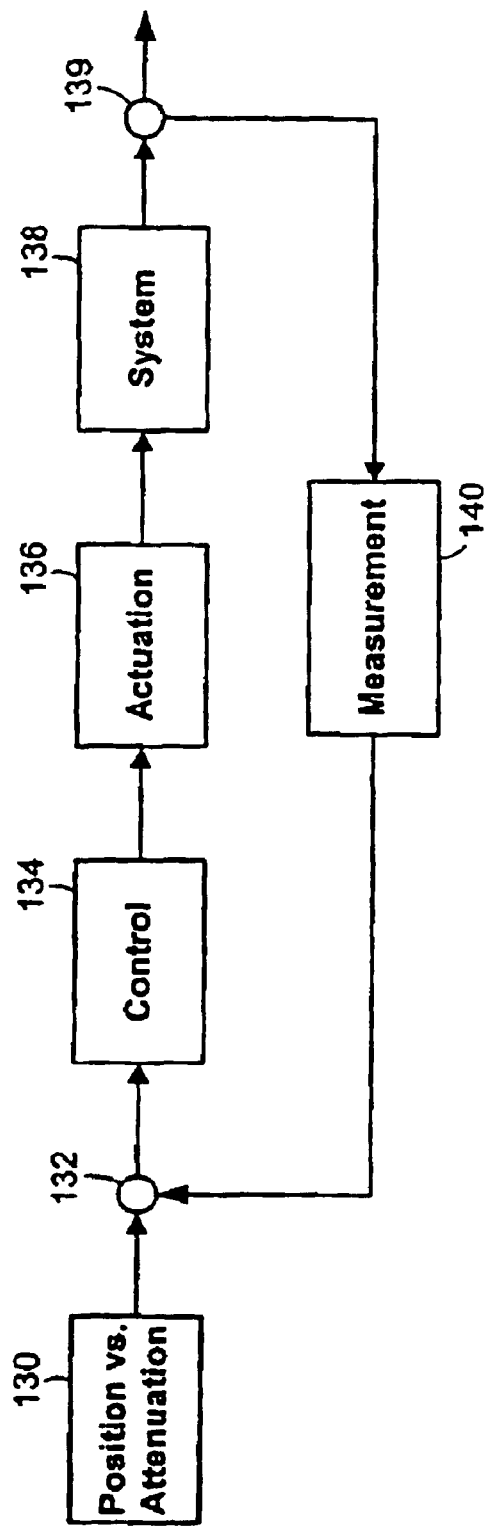
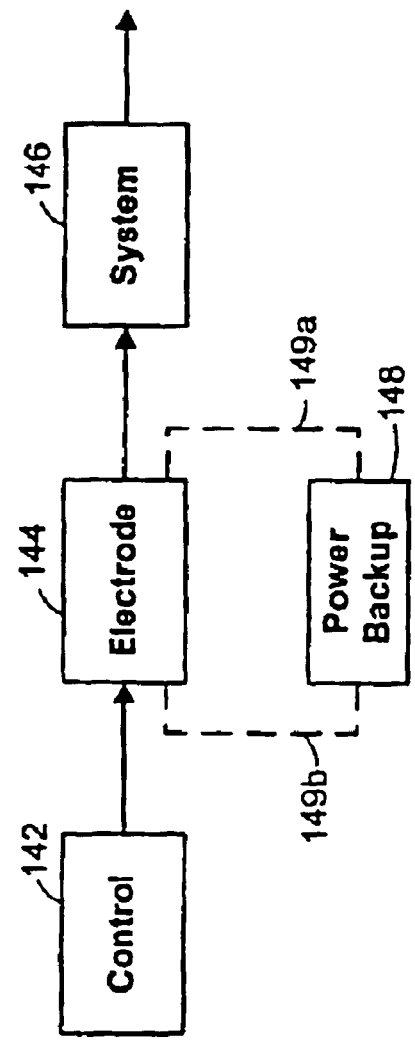
FIG. 6A
FIG. 6B

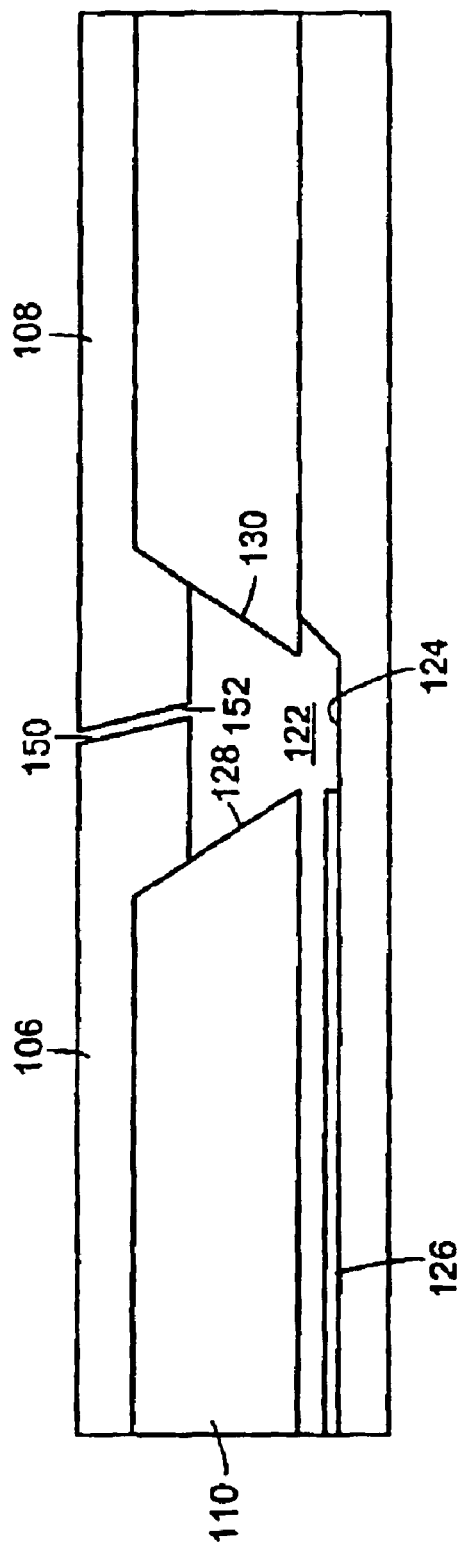

VARIABLE OPTICAL ATTENUATOR

FIELD OF THE INVENTION

The present invention relates generally to optical attenuators and, more particularly, to methods and structures for variable optical attenuation.

BACKGROUND OF RELATED ART

Optical networks, e.g., telecommunications networks, are formed of numerous devices. Switches, routers, couplers, (de)multiplexers, and amplifiers are common in optical networks. To function cohesively, these devices must be compatible with one another, i.e., they must be able to receive and transmit compatible signals. For some networks, this compatibility requires that network devices operate on signals within a specified intensity range—a constraint that makes network power level management quite important.

To properly manage network power levels, systems designers often rely upon optical attenuators. These attenuators can be stand-alone or integrated with other devices to controllably set signal intensities. In this way, intensity can be controlled between serial devices like amplifier stages, between parallel devices like switching banks, and even within a single optical device, like an attenuator integrated into an existing wavelength division multiplexing (WDM) device to normalize co-propagating channel intensities.

For many applications, attenuators are fabricated by suppliers that, in turn, supply optical device manufacturers for assembly into network appliances, like switches, routers, etc. Since different networks may be optimized for different signal intensity levels, suppliers will often make a batch of identical optical devices and then tailor some of them to meet the needs of the device manufacturer, i.e., the particular network.

For some time, suppliers have provided variable optical attenuators (VOAs). With a VOA, the amount of attenuation may be controllably varied. VOAs are commonly formed of a blocking structure (like a movable reflector or partially reflecting structure) disposed in a free space region between an input waveguide and an output waveguide. The position of the blocking structure within the free space region determines the amount of attenuation. Many structures have been proposed for the partially reflecting structure, for example. Even liquid crystal structures have been suggested as a partially reflecting surface for use in free space propagation regions.

In other forms, people have developed continuous wave attenuation devices formed of two waveguides twisted and fused together to form a bulk switching/attenuation region. Some of these devices also use thermal elements for selective switching and attenuation control. Still others have developed VOAs that use a Faraday rotator or pockel cell-like structure to attenuate based on polarization state.

While these techniques may be useful for some applications, they introduce undesirable manufacturing cost and complexity of operation. Furthermore, the devices are bulky and incompatible with networking environments where space is a concern. They are also difficult to install within a network and, therefore, can result in substantial network downtime or slowdown. Perhaps even more important, many of these known VOA devices introduce a substantial amount of unintentional and undesirable loss. For example, insertion loss and polarization dependent loss (PDL) greatly limit operation of these devices. These VOAs also exhibit stability problems, for example, malfunctioning if moved or jostled during operation.

It is, therefore, desirable to have VOAs that are not overly bulky, do not use extra components, such as partially reflecting elements or thermal switches, are cheaper to fabricate, and operate with less loss.

SUMMARY OF THE INVENTION

In accordance with an example, provided herein is an electrically variable optical attenuator comprising: a first waveguide support including an input waveguide section; a second waveguide support including an output waveguide section disposed in a position optically coupled to the input waveguide section; at least one of the first waveguide support or the second waveguide support being movable relative to the other waveguide support to provide coupled, optical misalignment, where said coupled, optical misalignment results in a range of optical attenuation values in the output waveguide section; and an electrically driven actuator for positioning the movable waveguide support to achieve a desired optical attenuation value.

In accordance with an example, provided herein is an electrically variable optical attenuator comprising: a first waveguide support including a first waveguide section; a second waveguide support having a movable distal end and including a second waveguide section coupled to the first waveguide section for propagation of an optical energy, the distal end being movable in response to an electric field; and an electrode disposed adjacent the distal end such that, in response to a drive signal being applied to the electrode, the distal end deflects toward the electrode from a first, coupled position to a second, coupled position to attenuate the optical energy a desired amount.

In accordance with an example, provided herein is an apparatus for use with an optical energy, the apparatus comprising: a waveguide arm having a movable distal end, the waveguide arm including a waveguide section propagating the optical energy; and a plurality of electrodes each disposed adjacent the waveguide arm, wherein each electrode of the plurality of electrodes receives one of a plurality of drive signals for controlling the deflection of the movable distal end.

In accordance with an example, provided herein is an electrically variable optical attenuator comprising: a first waveguide section formed within a first substrate portion; a second waveguide section formed within a second substrate portion and disposed in a first position relative to the first waveguide for optical coupling between the first waveguide and the second waveguide at a first intensity; and the second substrate portion forming a movable arm moving the second waveguide from the first position to a second position for optical coupling between the first waveguide and the second waveguide at a second intensity that is different than the first intensity, and an electrically driven actuator that moves the second waveguide section to the second, coupled position.

In accordance with an example, provided herein is an apparatus for attenuating an optical energy propagating between a first waveguide section and a second waveguide section coupled to the first waveguide section, the apparatus comprising: a first support including the first waveguide section and being movable in a first direction, wherein a first electrically driven actuator moves the first support; and a second support including the second waveguide section and being movable in a second direction that is at least partially opposite the first direction, wherein a second electrically driven actuator moves the second support.

BRIEF DESCRIPTION OF THE DRAWINGS

FIG. 6A is a block diagram showing programming operating a VOA in accordance with an example.

FIG. 6B is a block diagram showing programming operating a VOA in accordance with an alternative example.

FIG. 7 is a side view similar to FIG. 4 except that the optical fibers have end faces forming acute angles with a direction of propagation according to an embodiment.

FIG. 8 is a top view of the optical fibers of FIG. 7 showing an orientation of the optical fibers according to another embodiment.

DETAILED DESCRIPTION OF PREFERRED EXAMPLES

While preferred examples and numerous alternatives thereto are provided below, it will be appreciated by persons of ordinary skill in the art that these are merely examples and not intended to be exhaustive. On the contrary, the teachings herein may be used in many optical devices. Further, while the descriptions provided below are generally in the context of variable optical attenuation, the teachings herein may be used to move waveguides for other purposes, as will be apparent to persons of ordinary skill in the art. The teachings herein may also be used to correct for or induce misalignment between waveguides for purposes other than attenuation and in structures other than those exemplarily shown. Further, while electrically driven actuators in the form of electrostatic actuators are described in most examples, other electrically driven actuators may be used in any of the disclosed examples. Electrically driven actuators receive an electrical signal to actuate movement of a waveguide or support. Examples include electrostatic, electrothermic, and electromagnetic actuators, though persons of ordinary skill in the art will know of other electrically driven actuators, including other electromechanical actuators.

Figure 1:
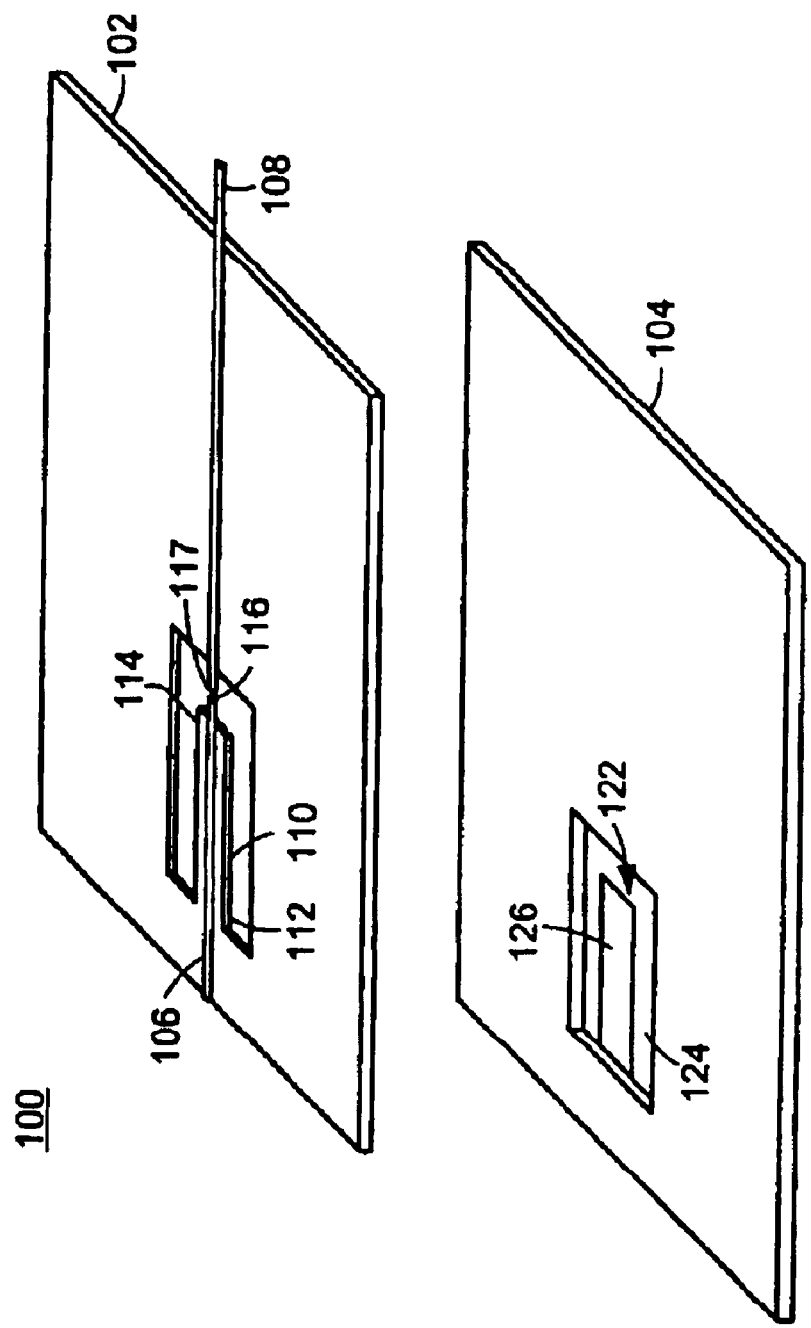
FIG. 1 is an illustration of an unassembled variable optical attenuator (VOA) having a movable waveguide support according to an example.

FIG. 1 illustrates an unassembled variable optical attenuator (VOA) 100 in accordance with an example. The VOA 100 illustrated includes a first substrate 102 and a second substrate 104, which in an assembled form are combined together to form a unitary structure. Preferably, the two substrates 102 and 104 are a silica or silicon material such as two silicon wafers. The substrates 102 and 104 may be formed of numerous materials, in addition to silicon, such as metals, dielectrics, or ceramics. The substrates 102 and 104 may be anodic, fusion, or heat bonded together. Other example techniques include sintered bonding, ultra-violet cured epoxy bonding, clamping, sodium silicate bonding using a heat treatment, and glass-frit bonding, which can form a small spacer layer between the substrates 102 and 104.

The first substrate 102 includes a first waveguide section and a second waveguide section, in the form of a first optical fiber 106 and a second optical fiber 108, respectively, for example, a 125 μm diameter, single-mode optical fiber. The illustrated waveguide sections are only exemplary in nature. The optical fibers 106 and 108 may be non-fiber, waveguide structures. Further, the first substrate 102 may include such structures disposed on or above the substrate, or formed within the substrate 102.

In the illustration, the optical fibers 106 and 108 are mounted directly to the substrate 102. The optical fiber 106 is mounted to a movable waveguide support 110, which in this example is a cantilever having a fixed, proximal end 112 and a deflectable, distal end 114. The movable waveguide support 110 may be formed by chemically or photolithographically etching the substrate 102, though other techniques will be known to persons of ordinary skill in the art.

The fiber 106 is mounted to the substrate 102 and to the movable waveguide support 110 thereof such that the fiber 106 has an overhang. That is, face 116 extends beyond the distal end 114 nearly abutting the optical fiber 108. In the example of FIG. 1, the optical fibers 106 and 108 are positioned on the substrate 102 in an aligned manner and in nearly abutting contact to ensure maximum coupling of optical energy between the two during operation of the VOA 100. Thus, the optical fibers 106 and 108 are positioned such that face 116 of the optical fiber 106 and a (hidden) face 117 of the optical fiber 108 are coupled for propagation of an optical energy.

Figure 2:
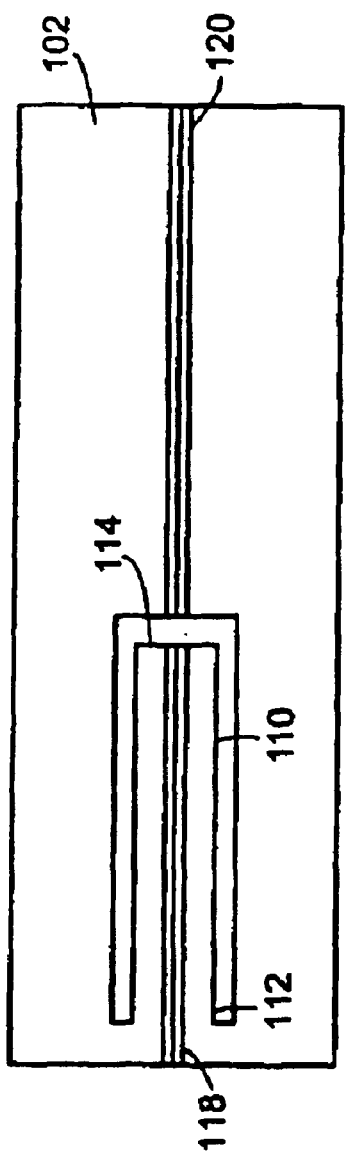
FIG. 2 is a top view of a first substrate of the VOA of FIG. 1, without the optical fibers shown.

FIG. 2 shows a top view of the substrate 102, optical fibers 106 and 108 omitted. As illustrated, the movable waveguide support 110 includes a mounting surface 118 for receiving the optical fiber 106. Mounting surfaces of various shapes may be used, including a geometrically-shaped V-groove, U-groove, rounded-groove, rectangular-groove, or a triangular-groove surface. With respect to the triangular groove surface, the opening in the substrate widens at increasing depths from the substrate upper surface.

The optical fiber 108 is mounted to the substrate 102 in a second mounting surface 120 that is preferably aligned with and identical in cross-sectional shape to the first mounting surface 118. The second mounting surface 120 forms a rigid support for the optical fiber 108. The mounting surfaces 118 and 120 are preferably formed together through etching, laser machining, or mechanical cutting. By forming the two surfaces 118 and 120 simultaneously, for example, alignment of the optical fibers 106 and 108 along a single propagation axis is ensured.

Figure 12:
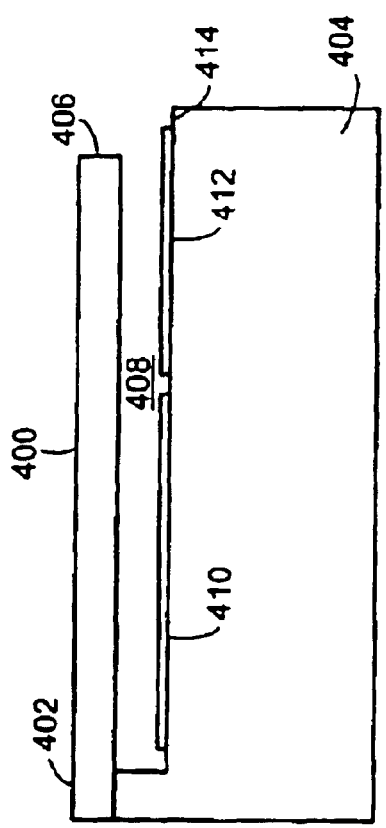
FIG. 12 is a partial side view of a multi-electrode drive for deflecting a movable waveguide support.
Figure 13:
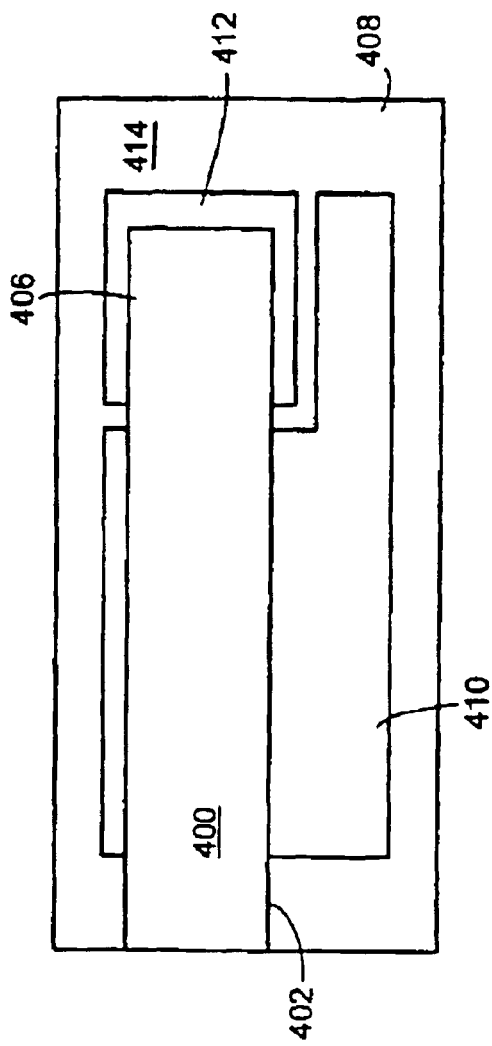
FIG. 13 is a top view of the structure of FIG. 12.
Figure 14:
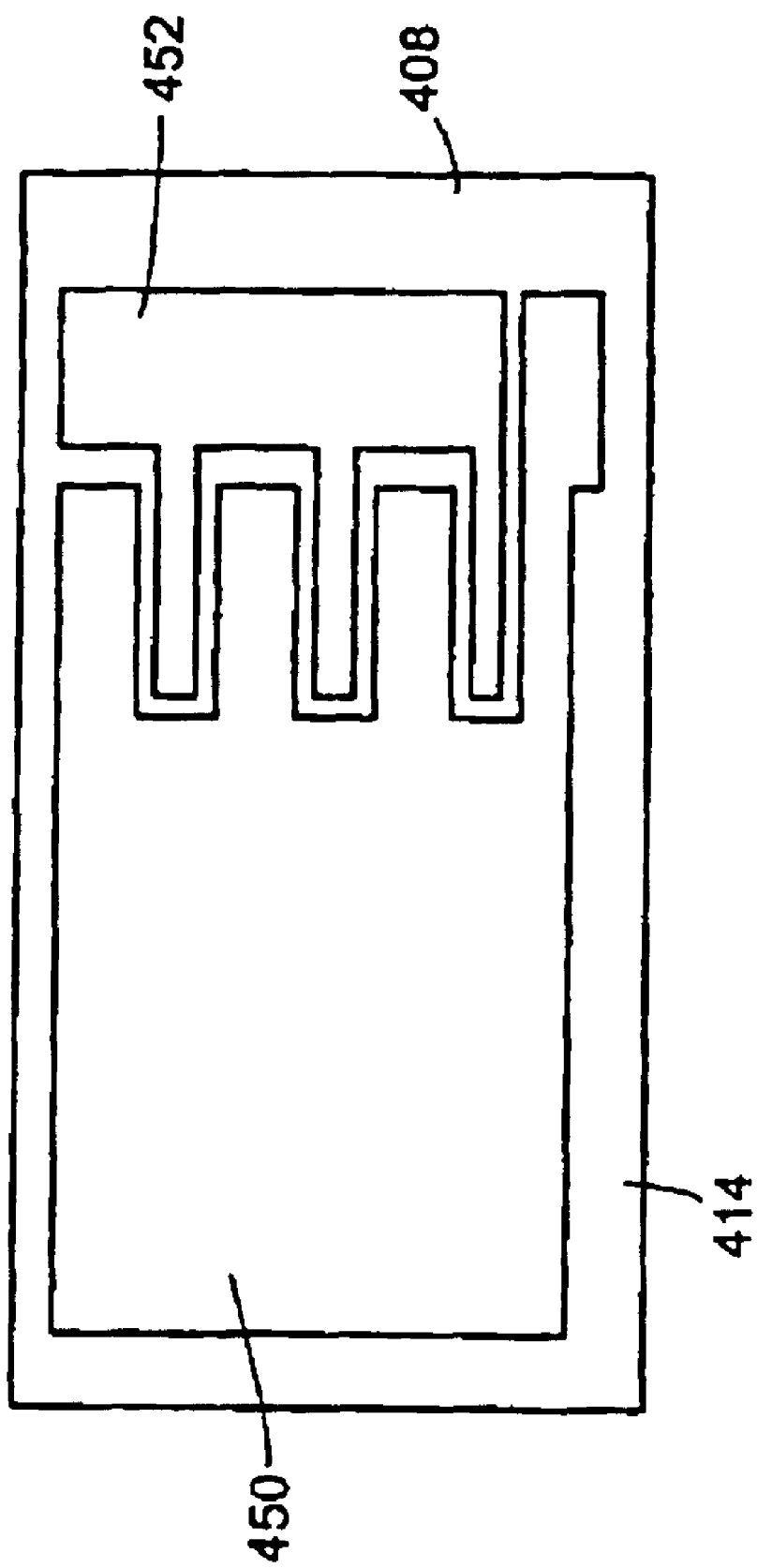
FIG. 14 is a top view of a multi-electrode drive having interdigital-configured electrodes for deflecting a movable waveguide support.

Returning to FIG. 1, when assembled, the movable waveguide support 110 extends over a recess 122 formed in the substrate 104. The recess 122 may be formed by known means, such as a chemical or photolithographic etch and has a floor 124 upon which an electrode 126 is deposited, formed, positioned, or otherwise located. The electrode 126 serves as an electrostatic actuator for controllably deflecting the movable waveguide support 110. For example, the electrode 126 may receive a drive signal that results in deflection of a desired amount. The movable waveguide support 110 may be a partially (semi-) or fully conducting material that moves under the electrostatic force of the electrode, for example. However, a separate electrode (or multiple electrodes) may be formed on the movable waveguide support 110 to facilitate or aid deflection. Thus, the movable waveguide support 110 may be insulating as well. A dielectric may be used to insulate the electrode 126 from the substrate 104. The electrode 126 extends the length of the support 110. The electrode 126 may instead be disposed adjacent only the distal end 112 or proximal end 114. And as shown in FIGS. 12–14, various electrode patterns may be used, as well.

Though in the illustrated embodiment, the movable waveguide support 110 and the rigid support formed by mounting surface 120 are integrally formed into the substrate 102, alternatively, the two supports 110, 120 may be separately formed and mounted to the substrate 102. For example, separate micro-electromechanical (MEMs) support structures may be used.

Figure 3:
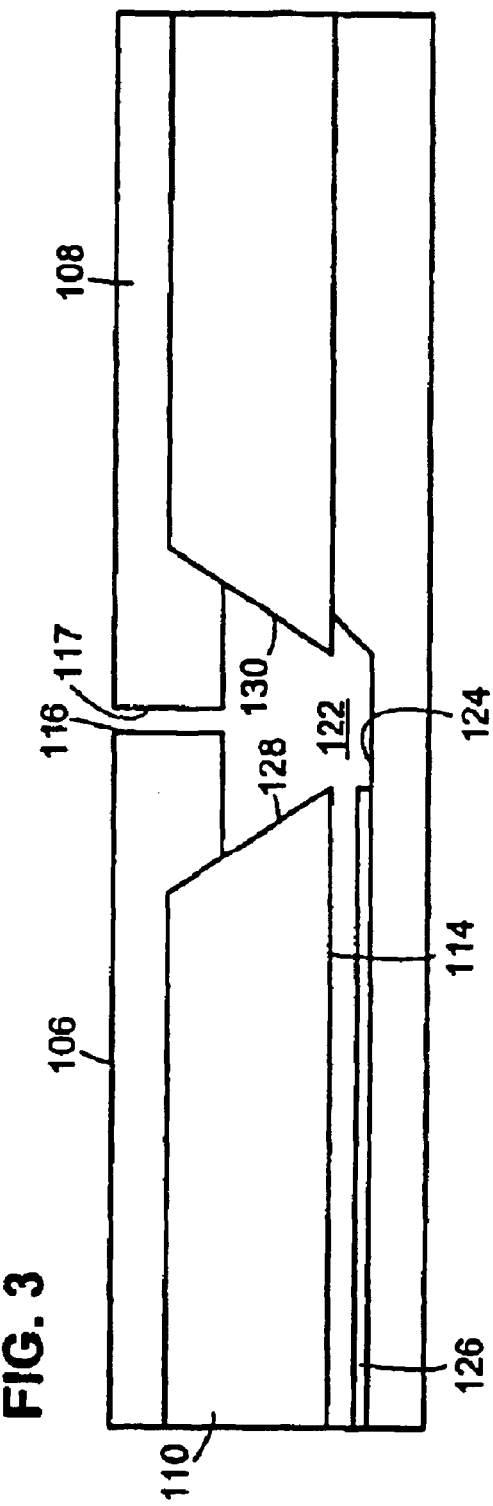
FIG. 3 is a side view of a portion of the first and second substrates of the VOA of FIG. 1 with the movable waveguide support in a first position.

Also, while the support 110 is in a cantilevered position with a movable distal end (see, FIG. 3, for example), springs, posts, clamps, and other structures may be used to suspend the support 110 over the recess 122. Also, as can be seen in FIG. 3, the VOA 100 has an edge 128 and an edge 130 that have been anisotropically etched or cleaved for clearance. However, any angle may be used for the faces.

In the position illustrated in FIG. 3, the optical fibers 106 and 108 are aligned along a single propagation axis for maximum coupling of energy from one to the other. This position may be considered a first, coupled position. The movable waveguide support 110 moves the optical fiber 106 relative to the optical fiber 108 to achieve variable attenuation.

In operation, the electrode 126 receives an electrical potential relative to the conducting or semi-conducting waveguide support 110 and, in turn, deflects the support 110 toward the electrode 126. The structure 126 described as an electrostatic actuator is only exemplary. The structure 126 may alternatively represent a electromagnetic actuator that receives an electrical signal and produces a magnetic field that attracts the support 110, which would be a magnetic material or affixed to a magnetic material. The structure 126 may also generally represent a thermal actuator that heats a region around the support 110 causing its material to expand or contract. Alternatively, the structure 126 may be placed directly on the support 110 acting as a heating element. These actuators are controlled by an electrical drive signal and are. electrically driven actuators. Persons of ordinary skill in the art will recognize that other electrically driven actuators, including other electromechanical actuators, may also be used.

Figure 4:
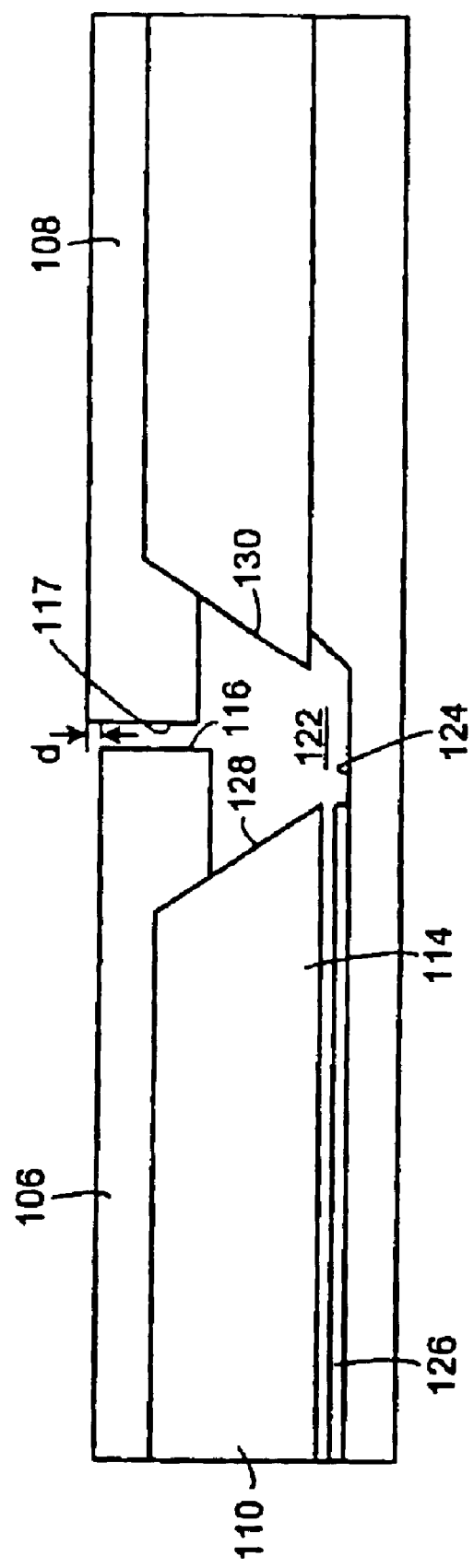
FIG. 4 is a side view of the structure of FIG. 3 of FIG. 1 with the movable waveguide support in a second position.

FIG. 4 illustrates an exemplary operation in which the electrode 126 has received an electrical potential that deflects the movable waveguide support 110 downward to a second, coupled position at which misalignment (indicated by a distance, d, in FIG. 4) between the optical fiber 106 and the optical fiber 108 is achieved. As will be appreciated by persons of ordinary skill in the art, the misalignment attenuates any energy propagating between the two fibers 106 and 108. The misalignment distance, d, may be of any value, though it is preferably less than the diameter of the optical fiber 108 to ensure that the two optical fibers 106 and 108 are always coupled for some energy propagation.

To allow for more efficient coupling, the two optical fibers 106 and 108 may have cores that expand toward the outer faces 116 and 117, respectively. Also, with larger core diameters at the faces 116 and 117, the sensitivity of attenuation to misalignment distance, d, may be reduced. A single mode fiber core of approximately 8 $\mu$m may be adiabatically expanded to approximately 20 $\mu$m, for example, using known techniques.

The amount of misalignment is dependent upon the potential differences between the electrode 126 the support 110, and, therefore, by the drive signal applied to the electrode 126. The potential difference may be set by a controller supplying the drive signal to the electrode 126 to establish the desired misalignment and the desired energy attenuation. Removing the electric potential difference between the electrode 126 and the support 110 returns the support 110 to its steady state position where the optical fibers 106 and 108 are preferably aligned for full coupling. Abrupt removal of the potential difference is preferred to allow for a fast response time. Of course, control circuitry may be used to slowly ramp-down (or up) the potential difference to provide time control over the movable waveguide support 110.

In the preferred example, control of the drive signal to the electrode 126 is achieved by controlling for an electrical parameter. For example, to achieve a given optical attenuation value, a drive signal corresponding to a predetermined misalignment position may be supplied. The electrical parameter may also be detected and compared to a desired value of the electrical parameter as part of a feedback calibration control.

Figure 5A:
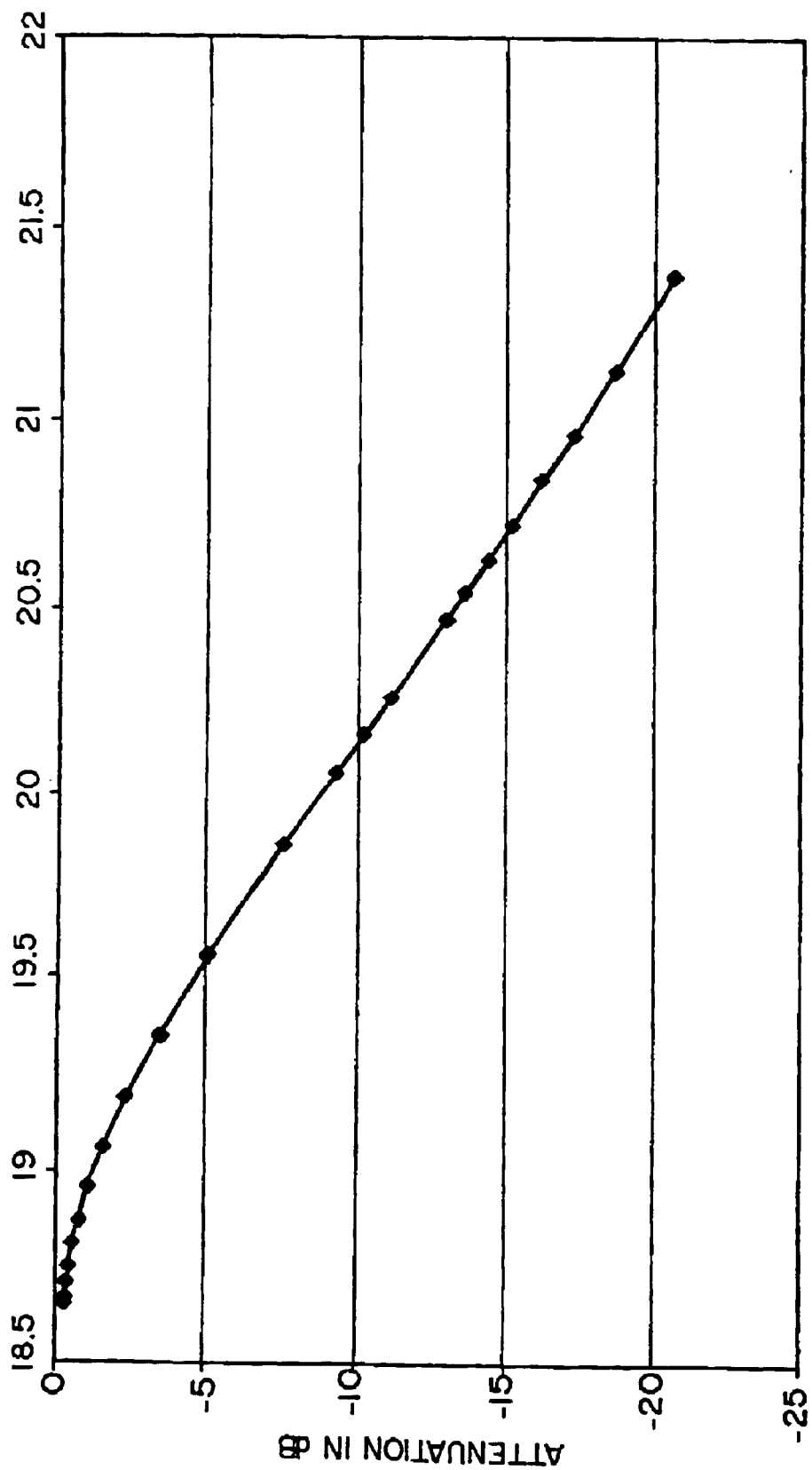
FIGS. 5A and 5B are plots of attenuation versus capacitance and voltage, respectively, with arbitrary units being shown.
Figure 5B:
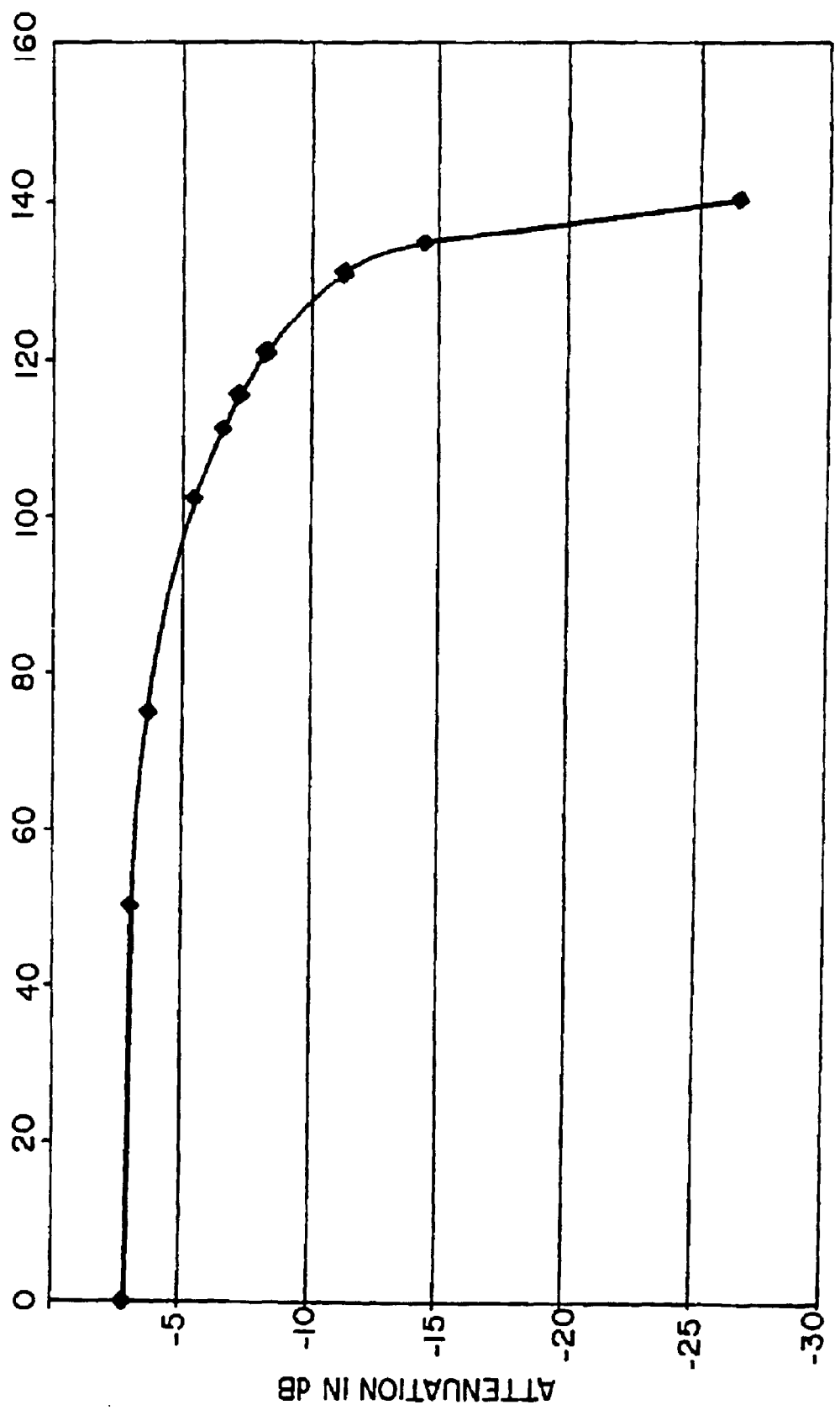

FIGS. 5A–B show exemplary attenuation curves for a VOA like that of VOA 100. Attenuation is shown as a function of capacitance and voltage, respectively, where the units are arbitrarily shown. In FIG. 5A, for example, the attenuation in decibels is nearly a linear function of capacitance, where the capacitance being measured may be any capacitance varying with movement of the waveguide support 110. A –5 dB attenuation of an energy propagating between optical fibers 106 and 108 corresponds to approximately 19.5 arbitrary units of capacitance between the electrode 126 and the support 110, and a –20 dB attenuation corresponds to approximately 21.5 arbitrary units of capacitance.

The linear nature of the capacitance dependence may be preferred for certain embodiments, nevertheless, other electrical parameters such as inductance, voltage, current, frequency and impedance may be used to set the desired attenuation in the VOA 100. FIG. 5B shows attenuation as a function of voltage, in an exemplary embodiment. The relationship is substantially horizontal for lower voltages and increases with an increasingly negative slope thereafter. The units of FIG. 5B are arbitrary units of voltage. In both examples of FIGS. 5A and 5B, as the value of the electrical parameter is increased, the misalignment distance, d, increases and the attenuation increases. And, as both examples demonstrate, a desired attenuation may be achieved by setting an electrical parameter to a desired, predetermined value for the VOA.

The ranges of FIGS. 5A and 5B are provided by way of example only. The VOA may be formed such that any desired capacitance, voltage, or other electrical parameter range may be used to set the desired attenuation. Furthermore, the dB loss levels illustrated are by way of example only.

FIG. 6A shows a block diagram of the processing flow for operating an example VOA. A first block 130 determines the movable support position, or misalignment distance, d, desired for a given attenuation level. As shown the block 130 may receive its own input, for example, an optical network control signal indicating a desired attenuation level. Data from block 130 is provided to an input point 132 and on to a control block 134, which may store or access a look-up table of data like that of FIG. 5A or 5B. The control block 134 may include memory and readable and executable software routines. The control block 134 may store or access misalignment distance versus electrical parameter values, as well. The control block 134 controls the actuation block 136, which may represent the electrically variable optical attenuator, such as the electrode 126 and support 110 pair.

By controlling the actuation block 136, the control block 134 also affects system block 138, which in the example of FIG. 1 represents the movable cantilevered support 110. A VOA output is provided by the system block 138 and a portion, or all, of that VOA output is routed by an output point 139, such as a partial reflector, to a measurement block 140.

In the example of FIGS. 1–3, if the electrical parameter is capacitance, the movable waveguide support 110 may be deflected by a DC signal applied to the electrode 126, while the control block 134 provides a separate AC signal across the electrode 126 and the support 110 via blocks 136 and 138 to detect the detectable value of an electrical parameter. Capacitance, current, inductance, frequency, etc. may be detected in this manner. Alternatively a DC signal may be used to measure other electrical parameters. In any event, FIGS. 1–3 show that a single electrode pair may be used to deflect a movable waveguide support and to determine or sense a detectable value of an electrical parameter for feedback control. Alternatively, separate electrodes may be used for moving and detecting.

The detectable value from the point 139 is provided to a measurement block, which may derive an actual value of the detected value or may compute a distance or attenuation based upon the detectable value. The measurement block, may be part of a controller or processor including other blocks shown in FIG. 6A. The detected value of the electrical parameter is provided by block 140 to the input point 132 and on to control block 134, which determines if the detected value equals the desired electrical parameter value. The control block 134 may also determine if a desired misalignment or position value as been achieved. If the two values do not match, the control block 134 will direct the actuation block 136 to move the support accordingly until the two values do. If the two values do match and the desired attenuation is not achieved—a determination that could be made with the use of a separate photo detector having an input provided to the control block 134—then the control block 134 can adjust the actuation in the system until the desired attenuation is achieved. The control block 134 may also up-date its look-up table data in such cases, as they would suggest that the stored attenuation versus electrical parameter data is no longer accurate.

The processing of FIG. 6A may be achieved entirely on a VOA chip that has a control circuit and memory storage, or the processing may be from external components. It will be understood by persons of ordinary skill in the art that the processing shown may further include additional processing blocks and/or an input device like a keyboard, touch-screen or other manual input or user-interface device, as well as an output device like a computer monitor.

FIG. 6B shows alternative processing of a VOA. As illustrated, a control block 142 has memory storage or access and readable and executable software routines for determining a desired drive signal for deflecting a movable substrate, when the block 142 supplies that drive signal to an electrode block 144. The electrode block 144 deflects a cantilevered movable waveguide support forming part of a system block 146. In this way, the processing of FIG. 6B is similar to that of FIG. 6A.

FIG. 6B, however, also includes a power backup block 148 that preferably supplies a consistent amount of drive signal potential to the electrode block 144, such that if the power to the control block 142 is removed for some reason the power backup block 148 will power the electrode block 144, retaining the drive signal to the electrode, upon fault, to retain the movable waveguide support in its pre-fault position. Thus, the processing of FIG. 6B is a hold-in-place control that retains VOA attenuation at a given value, even upon fault. The power backup block 148 may be achieved in known ways. For example, it may be a battery backup or any power source that supplies power under a controlled slow leakage, such as a super-capacitor. Various response times may be used for the power backup block 148, however in the preferred example the power backup block 148 is continuously coupled to the electrode block 144 via electrical leads 149a and 149b so that the misalignment position does not change upon fault.

FIG. 7 illustrates an alternative example of the structure of FIG. 4, where the optical fibers 106 and 108 have faces 150 and 152 that have been cleaved, polished, and anti-reflection coated at an acute angle to the direction of propagation. With this configuration, signal noise may be reduced. The acute cleave on the optical fibers 106 and 108 is visible from a side view, as shown in FIG. 7. Alternatively or additionally, the optical fibers 106 and 108 may be oriented such that a cut is visible along any radially position. For example, the optical fibers 106 and 108 are shown in a top view in FIG. 8 where the acute cleaved faces 150 and 152 are visible. Orienting the optical fibers 106 and 108 in this configuration allows an operator to manually adjust the spacing between faces 150 and 152 by looking down on the VOA. Of course, machine vision tools and other detecting structures may be used instead to set the spacing between faces 150, 152.

Figure 9:
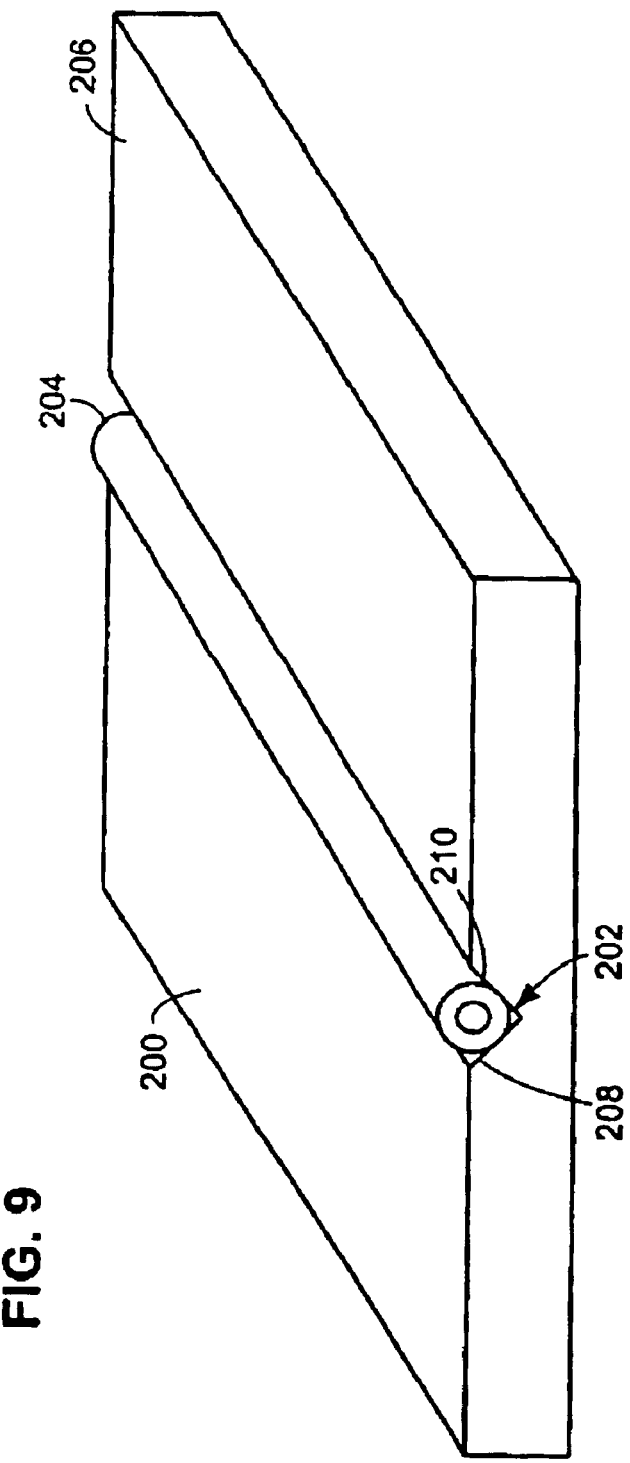
FIG. 9 is an illustration of an example support having a mounting surface that receives an optical fiber according to an embodiment.

FIG. 9 illustrates an exemplary portion of a substrate 200 for use in a VOA. The substrate 200 includes a mounting surface 202 for receiving an optical fiber 204 and may represent the deflectable mounting surface of a movable waveguide support or a rigid mounting surface, like surface 120. The mounting surface 202 is formed extending below a top surface 206. The mounting surface 202 is optional, but preferred to provide lateral registration of the optical fiber 204 for alignment to another optical fiber. With the substrate portion 200 used in a cantilevered configuration, deflection of a distal end would move the substrate 200 in a vertical direction relative to an electrode in a horizontal plane. The receiving walls 208 and 210 would prevent the optical fiber 204 from moving in a lateral direction across a horizontal plane; instead the optical fiber 204 would only move in a vertical plane. The surface 202 extends the length of that portion of the optical fiber 204 shown and includes a first receiving wall 208 and a second receiving wall 210. The receiving walls 208 and 210 are preferably 111 Miller indices planes when (100) silicon is used for the substrate 200, though the walls 208 and 210 may be cut along other orientations.

Figure 10:
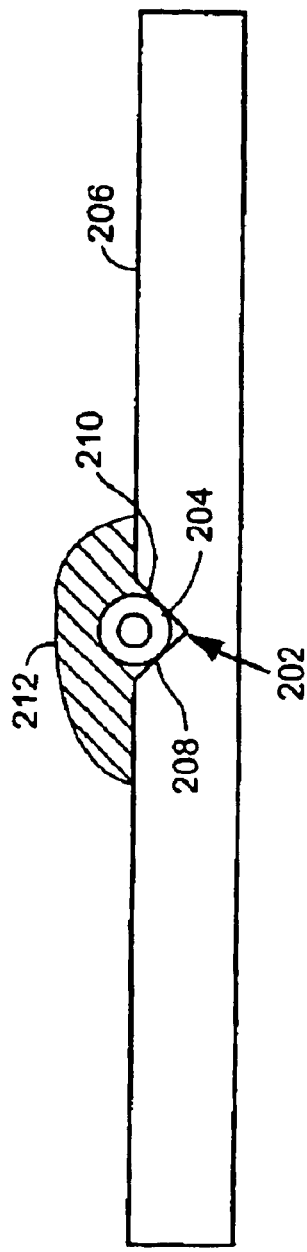
FIG. 10 is a front view of the structure of FIG. 9 additionally showing an adhesive mounting of the optical fiber to the surface.

Though, the surface 202 is shown forming a V-groove opening for receiving an optical fiber or waveguide, the surface 202 may take other geometric forms, such as a U-shape, rounded-shape, rectangular-shape, or triangular-shape in cross-section. FIG. 10 shows the optical fiber 204 is mounted in the mounting surface 202 via an adhesive layer 212, which may be an epoxy or other adhesive material. The mounting surface 202 is optional, however. The optical fiber 204 may be adhesively mounted or clamped directly to the top surface 206 or mounted using other known techniques.

Figure 11:
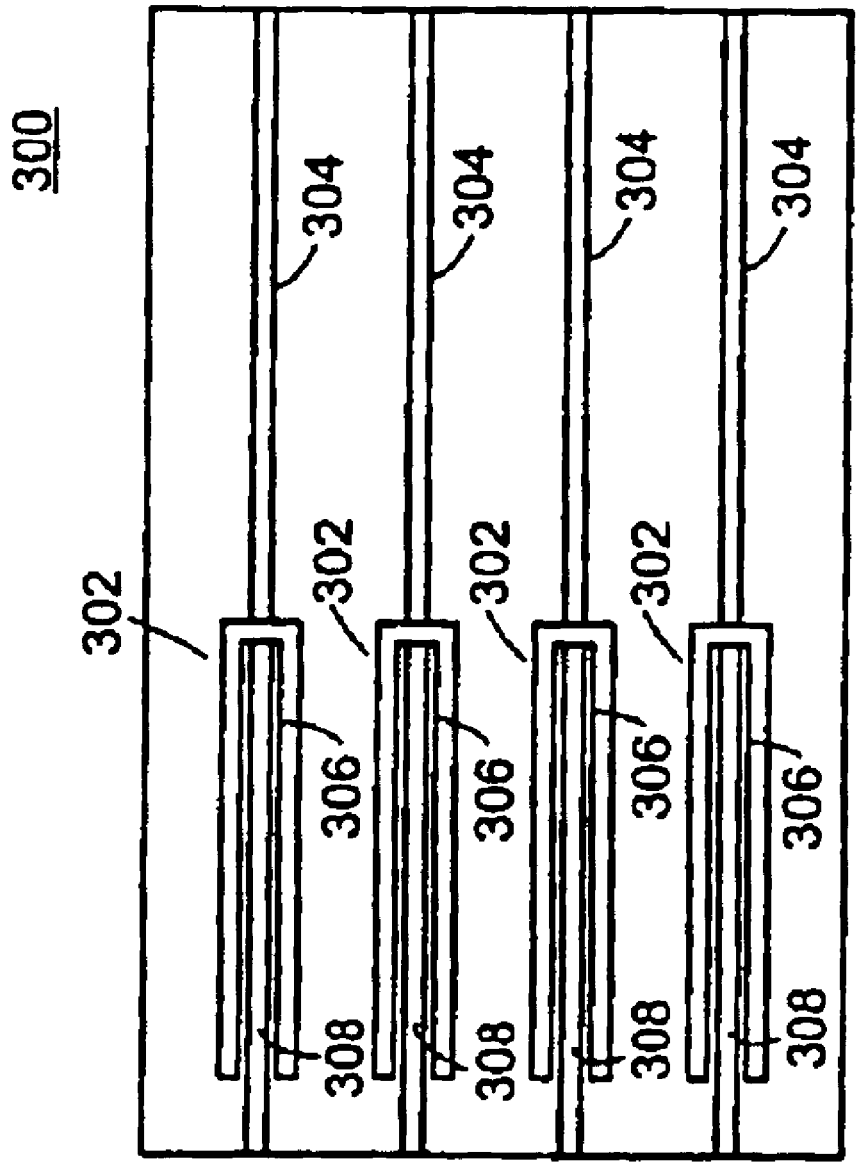
FIG. 11 is a top view of an exemplary multiple VOA structure.

An attenuator array that individually attenuates energy within many optical fibers may also be formed. FIG. 11 depicts a top view illustration of a VOA array 300 having four individual VOAs 302, each VOA 302 having a fixed mounting surface 304, a movable waveguide support 306, and a movable mounting surface 308 formed in the movable waveguide support 306. With the multi-channel VOA 300, each VOA 302 may be individually controlled to selectively attenuate energy propagating along any of the paths shown. While four VOAs are shown, any number of VOAs may be used.

FIGS. 12 and 13 illustrate another embodiment in which multiple electrodes are used to deflect a movable waveguide support. In some circumstances, the electrostatic force deflecting the movable waveguide support may be strong enough to overcome the opposing mechanical force from the cantilevered configuration and place the cantilever in a snap-down condition, in which the cantilever is pulled all the way down to and contacting the electrode. A multiple electrode configuration, where each electrode is separately controlled, may be used to offer more control over cantilever deflection, preventing snap-down and allowing the cantilever to deflect a larger distance into the recess.

A movable waveguide support 400 is shown in FIGS. 12 and 13. The movable waveguide support 400 is similar to that of support 110. The movable waveguide support 400 is in a cantilevered configuration whereby a proximal end 402 is affixed to a substrate 404, and a distal end 406 extends over a surface 408 formed in the substrate 404. The surface 408 includes two electrodes 410 and 412, which may be coupled to a single controller or separate controllers, though in either case, the drive signals provided to the electrodes 410 and 412 preferably are different. Alternatively, the drive signals may be a common drive signal. Different drive signals may maximize the deflection of the support 400. Also, either or both of the electrodes may be used to detect the detectable value of an electrical parameter as part of a feedback control adjusting the position of the movable waveguide support 400.

By using multiple electrodes, the support may be made to deflect into a greater portion of the gap between the support 400 and a surface floor 414—that gap being termed a deflection region herein—than with a single electrode. The electrodes 410 and 412 may be ramped up to their maximum drive signal values at different ramping rates. If electrode 412, for example, is ramped up at a slower rate than electrode 410, the end of the support 400 closer to the proximal end 402 will receive more electrostatic force pulling that region toward the surface floor 414, while less force will be applied to pull the distal end 406. This driving would allow the distal end 406 to deflect without causing the downward deflection to contact the electrode 412 with the distal end 406.

Though two electrodes 410 and 412 are shown in FIGS. 12 and 13, more electrodes may be used. Further, other electrode patterns may be used. FIG. 14 shows an interdigital electrode configuration in which two electrodes 450 and 452 are in an interdigital pattern in surface 408. When two potentials are applied to the electrodes 450 and 452, part of the electric field flux from the higher potential electrode will be terminated into the adjacent electrode. The lower potential electrode could even be driven to a negative voltage, such that only a fraction of the electrostatic force is applied to the support 400 (not shown). The net force on the support 400, therefore, can be made into a relation equivalent to the mechanical restoring load of the deflected support 400.

Figure 15:
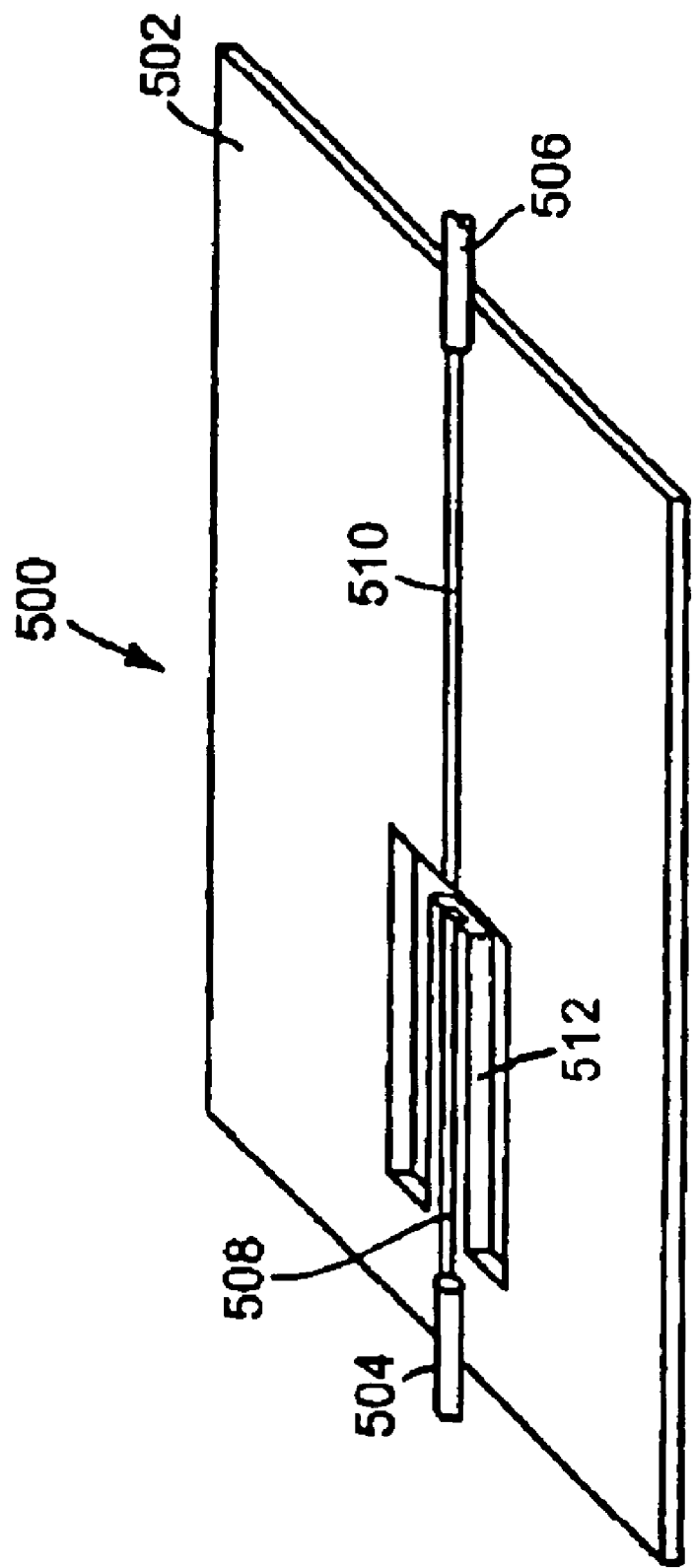
FIG. 15 is an illustration of substrate with an optical fiber and a waveguide section in accordance with another example.

FIG. 15 shows an optical device 500 that may also be used in a VOA. The device 500 has a substrate 502 that may be formed of materials like those described above with respect to substrates 102 and 104. Two optical fibers 504 and 506 are mounted to the substrate 502, for example, through a mounting surface (not shown). The optical fiber 504 is coupled to a first waveguide section 508 within the substrate 502, and the optical fiber 506 is coupled to a second waveguide section 510 also within the substrate. The two waveguide sections 508 and 510 are aligned along a single propagation axis and are coupled at their respective inner faces.

The first waveguide section 508 and the second waveguide section 510 are preferably formed in the substrate 502 through known techniques. Exemplary techniques include photolithographically etching a waveguide region and depositing or growing an appropriate index of refraction material therein or doping a portion of the substrate 502, for example, through ion-implant doping may also be used. The waveguide sections 508 and 510 may be rectangular in cross-sectional profile or rounded or have other profiles, as designed.

In the illustrated example, the waveguide section 510 is rigid. The waveguide section 508 is formed partially on a cantilever 512 formed in the substrate 502 and is thus movable. That is, the waveguide section 508 may be made to deflect, thereby creating a misalignment between waveguide sections 508 and 510 for attenuating an optical energy propagating therebetween.

Figure 16:
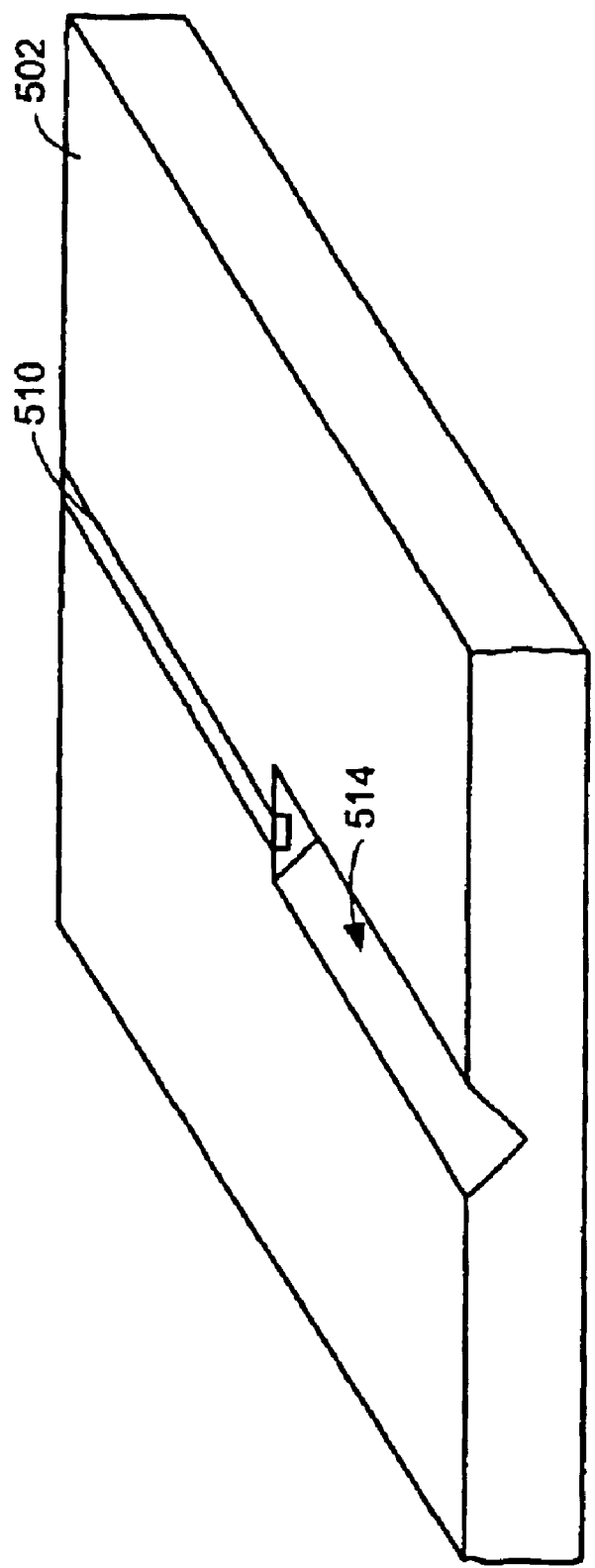
FIG. 16 is an illustration of a portion of the substrate of FIG. 15 showing a surface and a waveguide section.

FIG. 16 is an expanded view of a portion of the optical device 500 showing a mounting surface 514 for receiving an optical fiber and for coupling the core of that optical fiber to the waveguide section 510. The illustrated mounting surface 514 is a V-groove; however, any of the alternative structures described herein may be used. The mounting surface 514 extends below the waveguide section 510 a sufficient distance to align the core of a fiber with the entrance face of the waveguide section 510 such that insertion loss between the two is minimized. Antireflection coatings, index matching fluid, or other techniques may be used to ensure minimization of loss, as well.

The examples illustrated in FIGS. 15 and 16 may be part of an individually formed VOA or a more complex structure such as an application specific integrated circuit (ASIC) having additional optical devices or circuit devices formed in the substrate 502. For example, either waveguide section 508 or 510 may represent an active device, such as a laser or amplifier that is used in conjunction with the cantilevered support structure.

Figure 17:
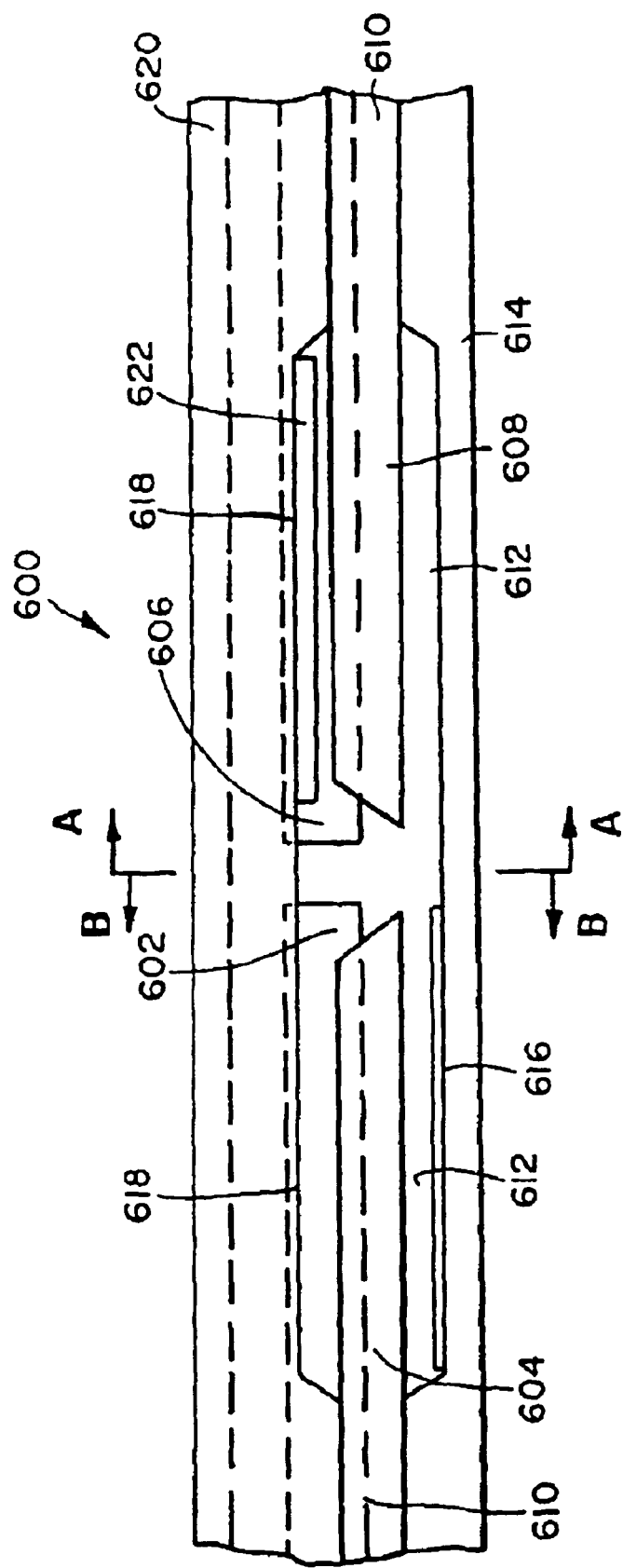
FIG. 17 is side view of a two-cantilever VOA in accordance with an example.

FIG. 17 shows a VOA 600 having a two-cantilever configuration, in which there are two movable waveguide supports having waveguide sections mounted on or formed therein. In the illustrated example, attenuation is achieved by moving the two movable waveguide supports in opposite directions. Thus, less deflection is required for each movable waveguide support to achieve the same level of attenuation. The two movable waveguide supports can be moved in the same direction if so desired, however. Or, the two movable waveguide supports may be moved in first direction and second direction that is at least partially away from the first direction, respectively. Furthermore, the movement of each movable waveguide support may be independently adjustable in response to a detectable value of electrical parameter that varies with the position of the particular support. Exemplary electrical parameters are provided hereinabove. Each movable waveguide support may be adjusted in response to any or all of these electrical parameters, and each support may be moved based upon a different electrical parameter than the other support. In fact, actuation on either support may be electrostatic, thermal, or magnetic exclusively.

A first optical fiber 602 is positioned on a first movable waveguide support 604, and similarly a second optical 606 is positioned on a second movable waveguide support 608. Each movable waveguide support 604 and 608 is formed in a first substrate 610, and each sits above a recess 612 formed in a second substrate 614. An electrode 616 sits in the recess 612 and provides electrostatic actuation of the movable waveguide support 604 deflecting it downward, i.e., toward the substrate 614. Electrode 616 may also be used to detect a detectable value of the electrical parameter for feedback control. A second surface 618 exists in a substrate 620 above the substrates 610 and 614. A portion of the surface 618 includes an electrode 622 that provides electrostatic actuation of the movable waveguide support 608 deflecting it upward, i.e., toward the substrate 620. Electrode 622 may also be used to sense a detectable value of the electrical parameter for feedback control. Thus, in the illustrated dual-cantilever configuration, the optical fibers 602 and 606 are deflected in opposite directions.

Figure 18:
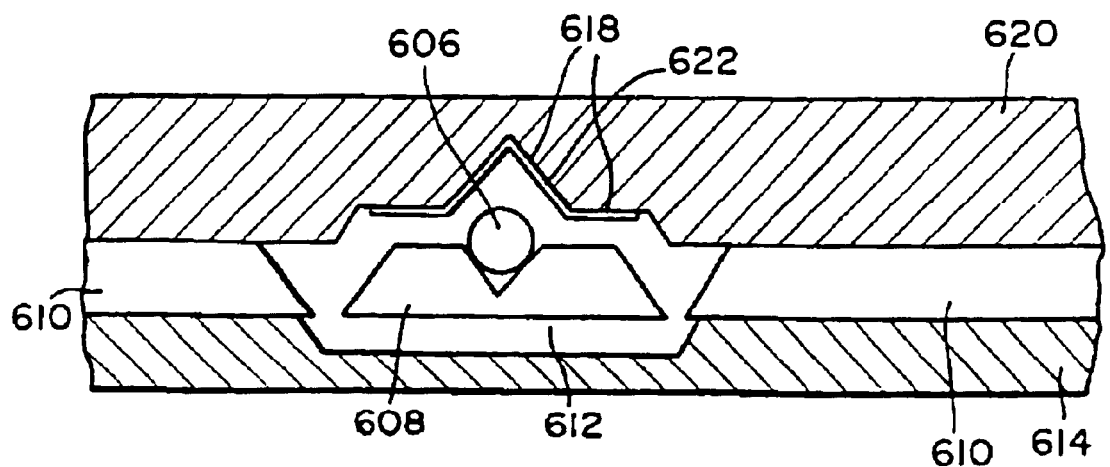
FIG. 18 is a view of the structure of FIG. 17 looking along lines AA therein.
Figure 19:
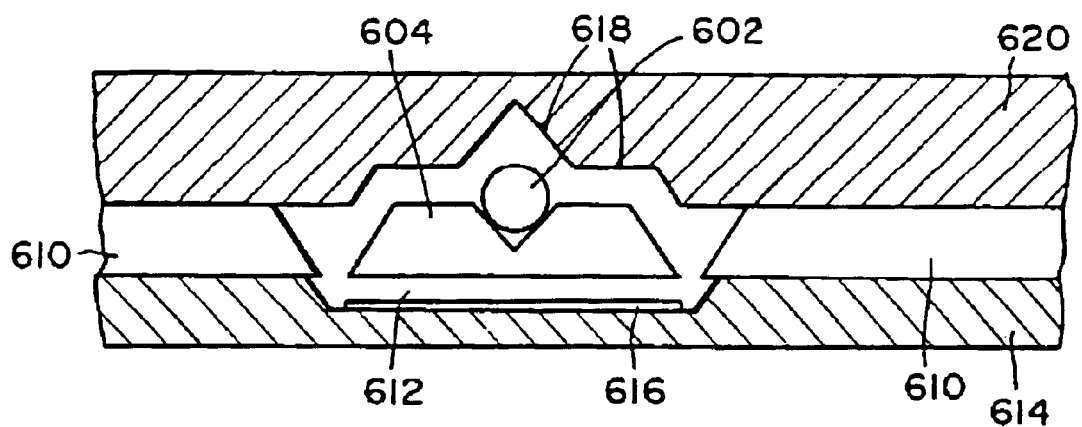
FIG. 19 is a view of the structure of FIG. 17 looking along lines BB therein.

FIG. 18 is a cross-sectional view looking into arrows AA of FIG. 17, showing the movable waveguide support 608 suspended above the recess 612 and below the electrode 622. The electrode 622 is formed on the second surface 618, which is a receiving surface that defines a clearance space into which the fiber 606 may be deflected. The cross-sectional shape of the receiving surface 618 is only exemplarily shown and may take the form of any of the mounting surface configuration described herein. FIG. 19 is a cross-sectional view looking along lines BB of FIG. 17 showing the movable substrate 604 suspend for downward deflection, i.e., toward the substrate 614.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What we claim is:

1. An electrically variable optical attenuator comprising:
    a first waveguide support including an input waveguide section;
    a second waveguide support including an output waveguide section disposed in a position optically coupled to the input waveguide section;
    at least one of the first waveguide support or the second waveguide support being movable relative to the other waveguide support to provide coupled, optical misalignment, where said coupled, optical misalignment results in a range of optical attenuation values in the output waveguide section; and
    an electrically driven actuator for positioning the movable waveguide support to achieve a desired optical attenuation value, wherein the electrically driven actuator positions the moveable waveguide support in response to an electrical parameter value that is sensed by the electrically driven actuator, wherein a detectable value of the electrical parameter varies with the position of a distal end of the moveable waveguide support, and wherein the electrically driven actuator is used in determining the detectable value.

2. The electrically variable attenuator of claim 1, wherein the first and second waveguide supports are formed in a first substrate.

3. The electrically variable attenuator of claim 2, wherein the input waveguide section and the output waveguide section are formed within the first substrate.

4. The electrically variable attenuator of claim 1, wherein the first and second waveguide supports each have a mounting surface for receiving the input waveguide section and the output waveguide section, respectively, wherein each mounting surface comprises a geometrically-shaped groove, each geometrically-shaped groove having substantially identical cross-sectional profiles.

5. The electrically variable attenuator of claim 1, wherein the input waveguide section is a first optical fiber and wherein the output waveguide section is a second optical fiber.

6. The electrically variable attenuator of claim 1, wherein an electrical parameter is a capacitance value.

7. The electrically variable attenuator of claim 1, wherein the electrically parameter is a voltage, current, impedance or frequency value.

8. The electrically variable attenuator of claim 1, further comprising a controller that controls the electrically driven actuator based on a comparison of the electrical parameter value and a desired electrical parameter value.

9. The electrically variable attenuator of claim 8, further comprising a back-up power source having stored power sufficient to supply the drive signal upon reduction of power to the controller.

10. The electrically variable attenuator of claim 1, wherein the electrically driven actuator comprises at least one electrode disposed adjacent the movable waveguide support for controllably moving the movable waveguide support in response to a drive signal.

11. The electrically variable attenuator of claim 10, further comprising at least two electrodes disposed adjacent the movable support, wherein the at least two electrodes receive different drive signals.

12. The electrically variable attenuator of claim 10, wherein the electrically driven actuator further comprises at least one electrode disposed on the movable waveguide support for interacting with the at least one electrode adjacent the movable waveguide support.

13. The electrically variable attenuator of claim 10, wherein at least a portion of the movable waveguide support is conductive for interacting with the at least one electrode adjacent the movable waveguide support.

14. The electrically variable attenuator of claim 1, wherein the movable waveguide support comprises a cantilever support arm having a fixed proximal end and a movable distal end, the movable distal end being adjacent the other waveguide support.

15. The electrically variable attenuator of claim 14, wherein the other waveguide support comprises a cantilever support arm.

16. The electrically variable attenuator of claim 1, wherein the electrically driven actuator is an electrostatic actuator.

17. The electrically variable attenuator of claim 1, wherein the electrically driven actuator is an electrothermic actuator.

18. The electrically variable attenuator of claim 1, wherein the electrically driven actuator is an electromagnetic actuator.

19. An attenuator array formed of a plurality of the electrically variable optical attenuators of claim 1.

20. An electrically variable optical attenuator comprising:
a first waveguide support including a first waveguide section;
a second waveguide support having a movable distal end and including a second waveguide section coupled to the first waveguide section for propagation of an optical energy, the distal end being movable in response to an electric field; and
an electrode disposed adjacent the distal end such that, in response to a drive signal being applied to the electrode, the distal end deflects toward the electrode from a first, coupled position to a second, coupled position to attenuate the optical energy a desired amount, wherein a detectable value of an electrical parameter varies with the position of the distal end and wherein the electrode is used in determining the detectable value.

21. The electrically variable optical attenuator of claim 20, further comprising a controller for comparing a detectable value of an electrical parameter, where that detectable value varies with the position of the distal end, to a desired value of the electrical parameter, the controller supplying the drive signal to move the distal end until the detectable value equals the desired value.

22. The electrically variable optical attenuator of claim 20, wherein a detectable value of an electrical parameter varies with the position of the distal end and the electrical parameter is a capacitance, voltage, impedance, current, frequency or inductance.

23. An apparatus for use with an optical energy, the apparatus comprising:
a waveguide arm having a movable distal end, the waveguide arm including a waveguide section propagating the optical energy; and
a plurality of electrodes each disposed adjacent the waveguide arm, wherein each electrode of the plurality of electrodes receives a different drive signal to deflect the moveable distal end in response to an electrical parameter having a detectable value that varies with the position of the moveable distal end, and wherein at least one of the plurality of electrodes is positioned to sense the detectable value.

24. The apparatus of claim 23, wherein at least one of the plurality of drive signals depends upon a detectable value of an electrical parameter, where the detectable value varies with the position of the movable distal end.

25. The apparatus of claim 23, wherein the electrical parameter is a capacitance, voltage, impedance, current, frequency or inductance.

26. The apparatus of claim 23, wherein the plurality of electrodes comprises a first electrode and a second electrode in an interdigital configuration with the first electrode.

27. The apparatus of claim 23, wherein the distal end extends over a deflection region having a gap height between the waveguide arm and the plurality of electrodes, and wherein the plurality of electrodes may deflect the distal end a distance larger than or equal to half of the gap height without deflecting the distal end into contact with any one of the plurality of electrodes.

28. The apparatus of claim 23, wherein the waveguide support is at least partially electrically conducting.

29. The apparatus of claim 23, wherein at least one of the plurality of electrodes is used to determine the detectable value of the electrical parameter.

30. An electrically variable optical attenuator comprising:
a first waveguide section formed within a first substrate portion;
a second waveguide section formed within a second substrate portion and disposed in a first coupled, position relative to the first waveguide for coupling at a first intensity;
the second substrate portion forming a movable arm that may move the second waveguide section to a second, coupled position for coupling at a second intensity that is different than the first intensity; and
an electrically driven actuator that moves the second waveguide section to the second, coupled position in response to an electrical parameter sensed by the electrically driven actuator, wherein a detectable value of the electrical parameter varies with the position of a distal end of the second waveguide section, and wherein the electrically driven actuator is used in determining the detectable value.

31. The electrically variable optical attenuator of claim 30, wherein the electrically driven actuator moves the second waveguide section in response to an electrical parameter that varies with a position of the movable arm.

32. The electrically variable optical attenuator of claim 31, wherein the electrical parameter is a capacitance, voltage, impedance, current, frequency or inductance.

33. The electrically variable optical attenuator of claim 31, wherein the position of the movable arm is adjustable in response to a desired value of the electrical parameter.

34. An apparatus for attenuating an optical energy propagating between a first waveguide section and a second waveguide section coupled to the first waveguide section, the apparatus comprising:
a first support including the first waveguide section and being movable in a first direction, wherein a first electrically driven actuator moves the first support in response to a first electrical parameter sensed by the first electrically driven actuator, wherein a first detectable value of the first electrical parameter varies with the position of a distal end of the first support, and wherein the first electrically driven actuator is used in determining the first detectable value; and
a second support including the second waveguide section and being movable in a second direction that is at least partially opposite the first direction, wherein a second electrically driven actuator moves the second support in response to a second electrical parameter sensed by the second electrically driven actuator, wherein a second detectable value of the second electrical parameter varies with the position of a distal end of the second support, and wherein the second electrically driven actuator is used in determining the second detectable value.

35. The apparatus of claim 34, wherein the first electrical parameter and the second electrical parameter are selected from the group consisting of capacitance, voltage, impedance, current, frequency and inductance.

36. The apparatus of claim 34, further comprising a controller that provides a first drive signal to the first electrically driven actuator and a second drive signal to the second electrically driven actuator.

37. The apparatus of claim 36, wherein the first drive signal and the second drive are a common drive signal.

38. The apparatus of claim 34, wherein the first electrically driven actuator and the second electrically driven actuator are selected from the group consisting of electrostatic, electromagnetic, and electrothermic actuators.

39. A variable optical attenuator comprising:
- a support including an input waveguide section and being movable from a first position to a second position, where the input waveguide section is coupled to an output waveguide section at the first position, and at the second position, and during movement;
- an electrically driven actuator positioned to move the support from the first position to the second position in response to an electrical parameter sensed by the electrically driven actuator, wherein a detectable value of the electrical parameter varies with the position of a distal end of the support and wherein the electrically driven actuator is used in determining the detectable value.

40. The variable optical attenuator of claim 39, wherein the electrically driven actuator is an electrostatic actuator comprising an electrode pair, and wherein the electrical parameter is capacitance.

41. The variable optical attenuator of claim 39, wherein the electrical parameter is selected from the group consisting of capacitance, voltage, impedance, current, frequency and inductance.

42. A method for attenuating an optical energy propagating between a first waveguide section and a second waveguide section coupled to the first waveguide section, the method comprising:
- disposing the first waveguide section on a movable support;
- in response to an electrically driven actuator, moving the movable support such that the first waveguide section is moved from a first coupled position to a second coupled position; and
- sensing in the electrically driven actuator, an electrical parameter wherein a detectable value of the electrical parameter varies with the position of a distal end of the movable support, and wherein the electrically driven actuator is used in determining the detectable value.

43. The method of claim 42, further comprising:
- deriving a drive signal from the electrical parameter sensed in the electrically driven actuator; and
- moving the movable support in response to the drive signal driving the electrically driven actuator.

44. The method of claim 42, wherein the electrical parameter is selected from the group consisting of capacitance, voltage, impedance, current, frequency and inductance.

45. The method of claim 42, wherein the electrically driven actuator is selected from the group consisting of electrostatic, electromagnetic, and electrothermic actuators.

* * * * *

UNITED STATES PATENT AND TRADEMARK OFFICE
CERTIFICATE OF CORRECTION

PATENT NO.        : 6,895,161 B2
APPLICATION NO.   : 10/261111
DATED             : May 17, 2005
INVENTOR(S)       : Mark G. Romo et al.

It is certified that error appears in the above-identified patent and that said Letters Patent is hereby corrected as shown below:

Title Page, Page 2

Item (56), Other Publications, left Column of page 2, 3$^{rd}$ reference, "Baltmore" should be --Baltimore--.

At Column 5, line 64, "are. electrically" should be -- are electrically --.

At Column 11, line 53, "configuration" should be -- configurations --.

At Column 12, line 20, "variable attenuator" should be -- variable optical attenuator --.

At Column 12, line 23, "variable attenuator" should be -- variable optical attenuator --.

At Column 12, line 26, "variable attenuator" should be -- variable optical attenuator --.

At Column 12, line 33, "variable attenuator" should be -- variable optical attenuator --.

At Column 12, line 37, "variable attenuator" should be -- variable optical attenuator --.

At Column 12, line 39, "variable attenuator" should be -- variable optical attenuator --.

At Column 12, line 42, "variable attenuator" should be -- variable optical attenuator --.

At Column 12, line 46, "variable attenuator" should be -- variable optical attenuator --.

At Column 12, line 50, "variable attenuator" should be -- variable optical attenuator --.

At Column 12, line 55, "variable attenuator" should be -- variable optical attenuator --.

At Column 12, line 59, "variable attenuator" should be -- variable optical attenuator --.

UNITED STATES PATENT AND TRADEMARK OFFICE
CERTIFICATE OF CORRECTION

PATENT NO. : 6,895,161 B2
APPLICATION NO. : 10/261111
DATED : May 17, 2005
INVENTOR(S) : Mark G. Romo et al.

It is certified that error appears in the above-identified patent and that said Letters Patent is hereby corrected as shown below:

At Column 12, line 64, "variable attenuator" should be -- variable optical attenuator --.

At Column 13, line 1, "variable attenuator" should be -- variable optical attenuator --.

At Column 13, line 6, "variable attenuator" should be -- variable optical attenuator --.

At Column 13, line 9, "variable attenuator" should be -- variable optical attenuator --.

At Column 13, line 12, "variable attenuator" should be -- variable optical attenuator --.

At Column 13, line 14, "variable attenuator" should be -- variable optical attenuator --.

At Column 15, line 19, "position, and at" should be -- position, at --.

At Column 16, line 15, "sensing" should be -- sensing, --.

Signed and Sealed this

Eleventh Day of September, 2007

JON W. DUDAS
*Director of the United States Patent and Trademark Office*